United States Patent [19]

Levitt et al.

[11] 4,027,104

[45] May 31, 1977

[54] ARRANGEMENT FOR AUTOMATICALLY GENERATING ALTERNATE TELEPHONE STATION IDENTIFICATION CODES

[75] Inventors: Arthur Paul Levitt, Hauppauge; Robert Vincent Oakley, New City; Roy Earl Patterson, Bay Shore, all of N.Y.

[73] Assignee: American Telephone and Telegraph Company, New York, N.Y.

[22] Filed: Apr. 28, 1976

[21] Appl. No.: 680,912

[52] U.S. Cl. .......................... 179/7 R; 179/18 FH; 179/27 DB
[51] Int. Cl.² ...................................... H04M 15/34
[58] Field of Search ............ 179/7 R, 7 MM, 7.1 R, 179/7.1 PP, 8 R, 8 A, 8.5, 18 FH, 18 D, 27 DA, 27 DB

[56] References Cited

UNITED STATES PATENTS

| | | | |
|---|---|---|---|
| 3,062,918 | 11/1962 | Williford | 179/7 R |
| 3,071,650 | 1/1963 | Cahill et al. | 179/8.5 |
| 3,943,298 | 3/1976 | Clark et al. | 179/18 FH |

Primary Examiner—Kathleen H. Claffy
Assistant Examiner—Gerald L. Brigance
Attorney, Agent, or Firm—Charles H. Davis

[57] ABSTRACT

A telephone communication system is disclosed in which toll calls of a first class are routed from an originating exchange to a remote exchange for completion and storage of billing information and toll calls of a second class are processed proximate to the originating exchange and independently of the remote exchange to avoid overburdening the trunking and other facilities between and at the originating and remote exchanges. For billing purposes, station identification information is transmitted from automatic identification equipment at the originating exchange to automatic message accounting facilities at the remote exchange or to locally situated recording equipment in accordance with the class of call in progress. The identification equipment has the capability to generate alternate identification codes for prescribed ones of calling stations and the equipment is controlled to generate the desired one of the codes for billing purposes also in accordance with the class of call.

13 Claims, 5 Drawing Figures

ARRANGEMENT FOR AUTOMATICALLY GENERATING ALTERNATE TELEPHONE STATION IDENTIFICATION CODES

BACKGROUND OF THE INVENTION

This invention relates to telephone switching systems in general and to circuits for generating calling station identification information. In particular, the invention relates to station identification equipment arranged to generate alternate station identification codes for billing purposes in accordance with the class of toll call being processed.

Arrangements in telephone communication systems for automatically identifying calling stations are well known. One such arrangement is described in U.S. Pat. No. 3,071,650, which issued to Cahill et al. on Jan. 1, 1963. In Cahill et al., in order to provide billing for toll calls, all traffic originating in small local exchanges and destined for the toll network is routed to a centralized tandem exchange, called a CAMA exchange, which is equipped with automatic message accounting, or AMA, facilities. In order to identify calling stations for the billing records accumulated at the CAMA exchange, each originating exchange is provided with automatic station identification (ANI) equipment, which identifies a calling station on request and transmits the identification information to the AMA facilities at the CAMA exchange. The ANI apparatus, although greatly effective for its intended purpose, is limited in that it is capable only of providing a single predetermined identification for each calling station. For example, in systems employing the Cahill et al teaching, a private branch exchange (PBX) customer may elect to have all toll calls automatically billed to the PBX general directory number, or the customer may elect to have manual operator identification of calling PBX stations so that the calls may be billed to the individual stations or to other desired special numbers. The customer may not, however, elect combinations of different billing schemes.

A need arises in certain situations to provide greater billing flexibility in order to best serve telephone customers. For example, many PBX customers desire that certain classes of toll calls originated from the PBX stations be billed to special identification codes, such as sales account numbers, and that other classes of toll calls be billed to the general PBX directory number. This arrangement whereby toll calls are billed to special codes dependent on the specific call in question is commonly referred to as Q-Z billing.

PBX customers may further desire that certain classes of toll calls be billed to individual PBX stations, whereas other calls be billed to the PBX general directory number.

Another example occurs with respect to small originating exchanges equipped for operation with an automatic message accounting and recording system (AMARS). The AMARS, which is described in 1976 *Bell Laboratories Record* 104, is designed to provide detailed billing records, similar to the records now provided by CAMA exchanges on toll calls, for local calls on the basis of actual usage of the network. For local traffic, the AMARS call monitoring equipment obtains call information, such as answer time and called party number, and communicates with automatic number identification equipment in the orginating exchange to identify a calling station and to transmit this information to a centralized site for storage and processing. For CAMA exchange toll traffic, however, the AMARS is inoperative and billing information for this traffic is accumulated in a CAMA exchange which communicates with the local exchange ANI equipment to obtain calling station identification information as described in Cahill et al. A need has been expressed by certain customers served by an AMARS to have the billing of local calls directed to a general directory number, while allowing for Q-Z and individual station billing for CAMA traffic.

SUMMARY OF THE INVENTION

Our invention fulfills the foregoing needs by providing in a telephone system, such as disclosed by Cahill et al. in U.S. Pat. No. 3,071,650, circuitry for generating a plurality of station identification codes in response to a call from stations of selected customers, and circuitry operated by the originating exchange in accordance with the class of call in progress for controlling the generating circuitry to select the desired identification code.

In a preferred illustrative exemplary embodiment to be described, a first call class consists of all conventional CAMA toll traffic originated by the customer stations and a second class consists of directory assistance traffic from the stations. Station identification equipment in the originating exchange is arranged to generate for the stations a multiparty identification code for CAMA calls which causes the seizure of an operator to effect billing to the individual calling station of the customer. The identification equipment is further arranged to generate the general directory number of the customer to which the billing of directory assistance calls is automatically directed.

It is understood that the invention is not to be limited to the foregoing preferred embodiment, but is applicable to any of the situations briefly mentioned, as well as to any other that falls within the spirit and scope of the invention.

BRIEF DESCRIPTION OF THE DRAWING

A more detailed understanding of the invention will be apparent from the following detailed description of an illustrative exemplary embodiment thereof when read in conjunction with the accompanying drawing in which.

DETAILED DESCRIPTION

In the following discussion, the initial digit of each equipment designation number, with a few exceptions to be identified, refer to the figure number in which the equipment or apparatus designated is located.

Figures 1, 5:
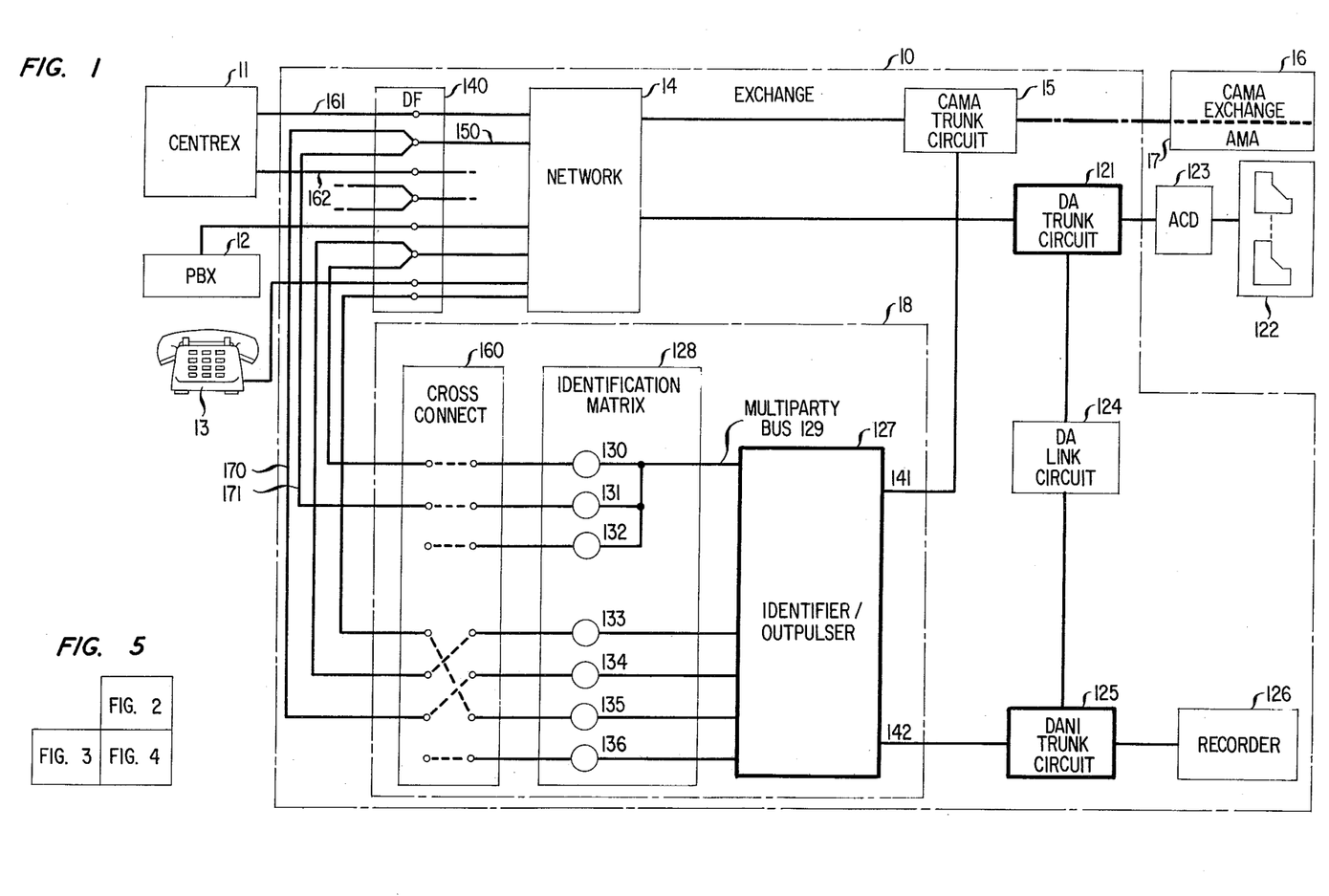
FIG. 1 illustrates a telephone communication system containing the invention and arranged to process conventional CAMA toll calls by means of a CAMA exchange in a manner similar to that described in Cahill et al., and to process directory assistance calls independently of the CAMA exchange, and FIGS. 2, 3, and 4, when arranged according to FIG. 5, illustrate the details of certain trunk circuits of FIG. 1 and improvements to automatic station identification equipment which cooperate to control the generation of desired alternate station identification codes in accordance with the class of call in progress.

The illustrative exemplary system of FIG. 1, operates to process CAMA toll calls by routing the calls from an originating exchange 10 to CAMA exchange 16 and to process directory assistance calls by means of separate facilities proximate to originating exchange 10 in order to prevent the need of supplementing CAMA facilities which otherwise would be required.

Switching exchange 10 serves customers, such as represented by CENTREX 11, PBX 12, and individual station 13. Network 14 of exchange 10 is operated to extend CAMA toll calls received from customers 11, 12, and 13 via CAMA trunk circuits, such as 15, to CAMA exchange 16, which is equipped with automatic message accounting (AMA) facilities 17 wherein is stored itemized billing information pertaining to the toll calls. For identifying a calling station to complete the billing information, CAMA exchange 16 communicates with automatic number identification, or ANI, equipment 18 at exchange 10 which, in turn, identifies the calling stations and outpulses the information to exchange 16 via CAMA trunk circuit 15.

For directory assistance traffic originated by customers 11, 12, and 13, network 14 is controlled to seize directory assistance trunk circuits, such as DA trunk circuit 121. DA trunk circuit 121, in turn, is connected to a directory assistance bureau 122, located proximate to exchange 10, by means of an automatic call distributor (ACD) 123. In this manner, the directory assistance traffic is processed locally to prevent overburdening the CAMA network.

In order to provide for the billing of directory assistance calls, ACD 123 communicates with ANI equipment 18 via trunk circuit 121, a directory assistance link circuit 124, and a directory assistance number identification, or DANI, trunk circuit 125. DANI trunk circuit 125 is further associated with a local recorder 126, wherein calling station identification information from ANI equipment 18 is routed for storage by means of DANI trunk circuit 125.

ANI equipment 18 comprises identifier/outpulser 127 which operates in conjunction with identification matrix 128 having individual number networks, such as 130 to 136, associated with station line appearances on the exchange 10 distributing frame (DF) 140. For identifying a calling station, identifier/outpulser 127 is operated by a seizure at one of its ports 141 or 142 to cause a signal to be transmitted through trunk circuit 15 or 125, and through the established connections of network 14 to a sleeve lead, such as 150, associated with the calling station line. A crossconnect field 160 in the ANI equipment 18 associates each of the station line sleeve appearances at DF 140 with at least one number network in matrix 128 to which the signal appearing on a sleeve lead of a calling station is applied to inform identifier/outpulser 127 of the identification code or codes of the station. Identifier/outpulser 127 scans matrix 128 to locate the signals, selects a signal in accordance with the port 141 or 142 which is seized and translates the signal into the appropriate identification code. Outpulser/identifier 127 then outpulses the code via its seized port 141 and 142 either to CAMA exchange 16 by means of trunk circuit 15 or to recorder 126 via DANI trunk circuit 125.

In accordance with a feature of our invention, selected customers, such as CENTREX 11 and PBX 12, may have CAMA toll calls billed to individual customer stations and directory assistance calls billed to the general CENTREX or PBX directory number. To provide this feature, each station line appearance of CENTREX 11 and PBX 12 at DF 140 is associated by the cross-connect field 160 with multiple number networks in matrix 128. Thus, for example, the sleeve appearance of CENTREX 11 station line 161 is associated by means of connections 170 and 171 with number networks 131 and 134. The sleeve appearances of each of the other station lines of CENTREX 11, such as 162, are likewise associated with other number networks. For example, the station connected to line 162 may be associated with number networks 132 and 136.

The number networks 133–136, although shown as single entities connected to identifier/outpulser 127, actually each consist of three isolation networks as described in Cahill et al., one residing in a primary matrix and having two outputs connected to the remaining two networks which reside in a secondary matrix. The latter two networks each have two output conductors which extend to identifier/outpulser 127, and these four output conductors combine to define the directory number of the associated station. Networks 130–132 are similarly arranged, except that each is associated with only one output conductor which is multipled to a common input of identifier/outpulser 127 referred to as multiparty bus 129.

In Cahill et al., a calling station may be associated with one of the directory number networks 133–136, or with a network 130–132 associated with the multiparty bus 129, but never with both. If the station is associated with multiparty bus 129, the identifying signal is applied to bus 129 by the number network associated with the calling station and causes identifier/outpulser 127 to generate and outpulse the multiparty identification code to trigger the seizure of an operator at exchange 16 to manually obtain the desired billing number.

In accordance with another feature of this invention, a call from any CENTREX 11 or PBX 12 station causes two identification signals to be applied to identifier/outpulser 127, one on multiparty bus 129 and the other from a number network such as 133–136 which is associated with the CENTREX 11 or PBX 12 directory number. In accordance with a further feature, the identifier/outpulser 127 is controlled by the seizing trunk circuit 15 or 125 to select one of the signals in accordance with the class of call in progress. Thus, for CENTREX 11 or PBX 12 CAMA toll calls, identifier/outpulser 127 is controlled by CAMA trunk circuit 15 to select the multiparty signal and to generate and outpulse a multiparty identification code to exchange 16; for directory assistance calls from CENTREX 1 or PBX 12, identifier/outpulser 127 is controlled by DANI trunk circuit 125 to select the signal defining the customer's general directory number for storage of the number in recorder 126.

The sleeve appearance of private station 13 is associated with only one number network 135 in matrix 128 which, in turn, is associated with the station directory number. Thus, for all toll calls from station 13, ANI equipment 18 operates to identify the station number such as taught by Cahill et al. The difference in the present illustrative embodiment is that the station 13 number is directed to CAMA exchange 16 for CAMA calls and to recorder 126 for directory assistance calls.

Since the details of operation of CAMA trunk circuit 15 and of ANI equipment 18 are not necessary for an understanding of our invention, the reader is referred to Cahill et al for a complete description thereof. The details of directory assistance trunk circuit 121 and DANI trunk circuit 125 are shown in respective FIGS. 2 and 4. The innovative details of identifier/outpulser 127 are shown in FIG. 3 along with sufficient cooperative structure described in detail in Cahill et al. for a complete understanding of the operation of our invention.

Figure 3:
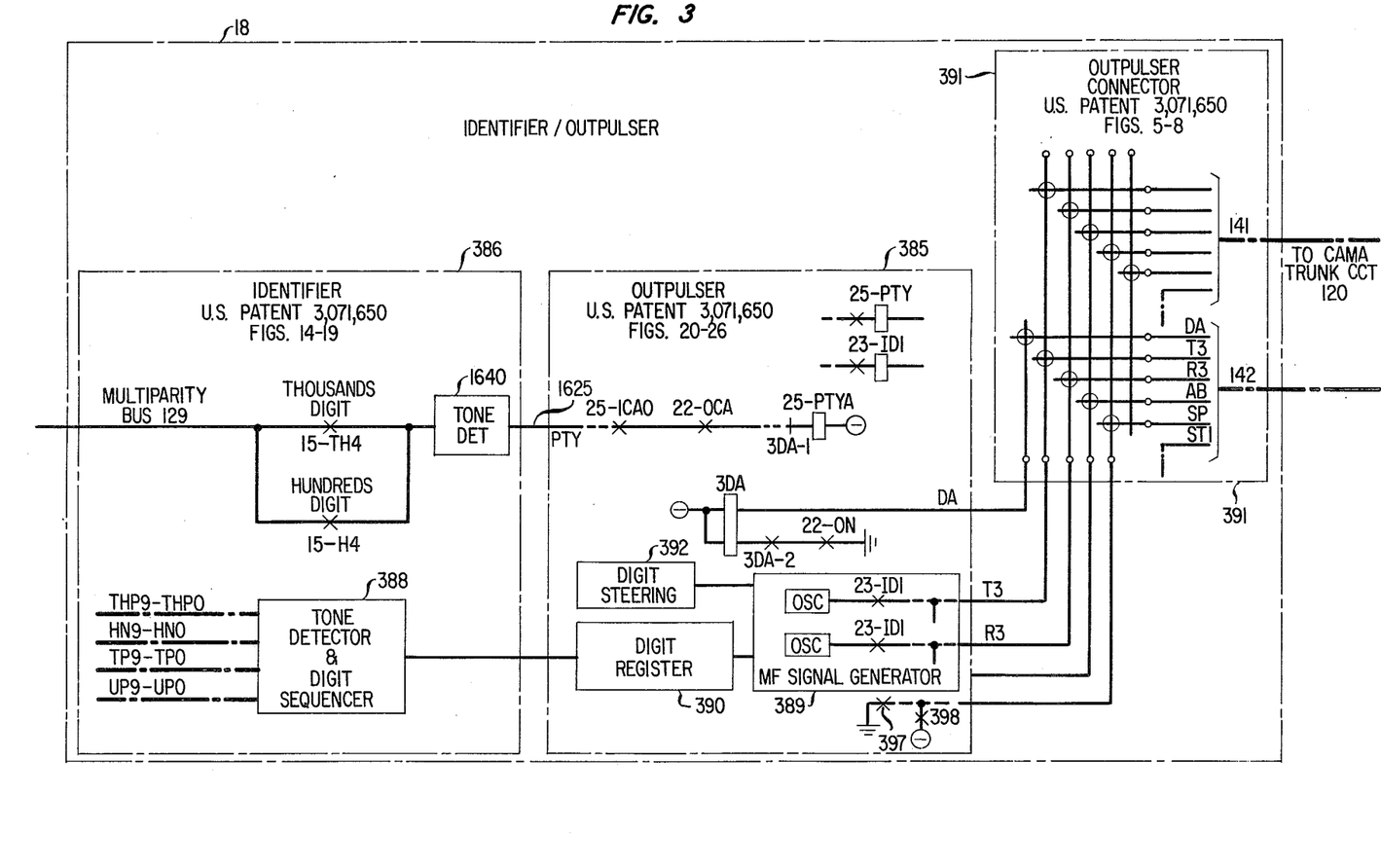
Figure 4:
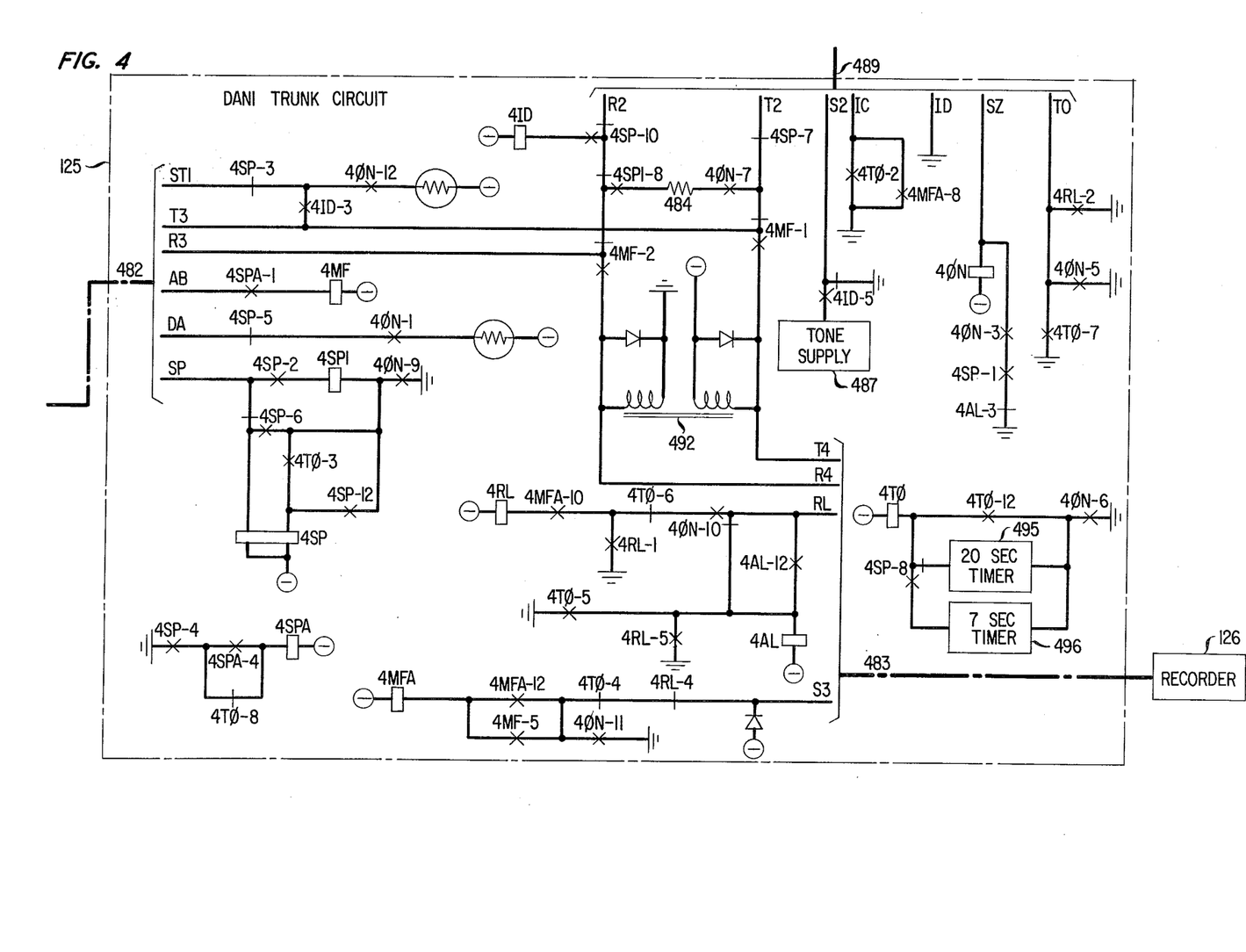

Specifically, identifier/outpulser 127 is depicted in FIG. 3 as comprising identifier 386, outpulser 385 and outpulser connector 391 which operates to couple outpulser 385 to DANI trunk circuit 125 in FIG. 4. For the convenience of the reader, certain of the equipment designations in FIG. 3 correspond to the designations in the Cahill et al. patent. The first two numerals of these designations reflect the figure number in Cahill et al. in which the equipment is disclosed. Specifically, in identifier 386, contacts 15-TH4, 15-H4 and tone detector 1640 are disclosed in Cahill et al in FIGS. 15 and 16, respectively. In outpulser 385, the contacts 25-ICAO, 22-OCA, 22-φN, relay 23-ID1 and multiparty relays 25-PTYA and 25-PTY are disclosed in Cahill et al. in the appropriate FIGS. 22, 23 and 25. The designation 129 is retained in FIG. 3 for the multiparty bus for consistency with FIG. 1 of the instant disclosure. Multiparty party bus 129 originates in Cahill et al. in FIG. 14 and is there designated as lead 1408. Lead 1625 originates in Cahill et al. in FIG. 16. The leads THP9-THPO, HN9-HNO, TP9-TPO and UP9-UPO are in FIG. 12 of Cahill et al and correspond to thousands, hundreds, tens and units digit leads from the number networks of identification matrix 128 in FIG. 1 of this disclosure.

Figure 2:
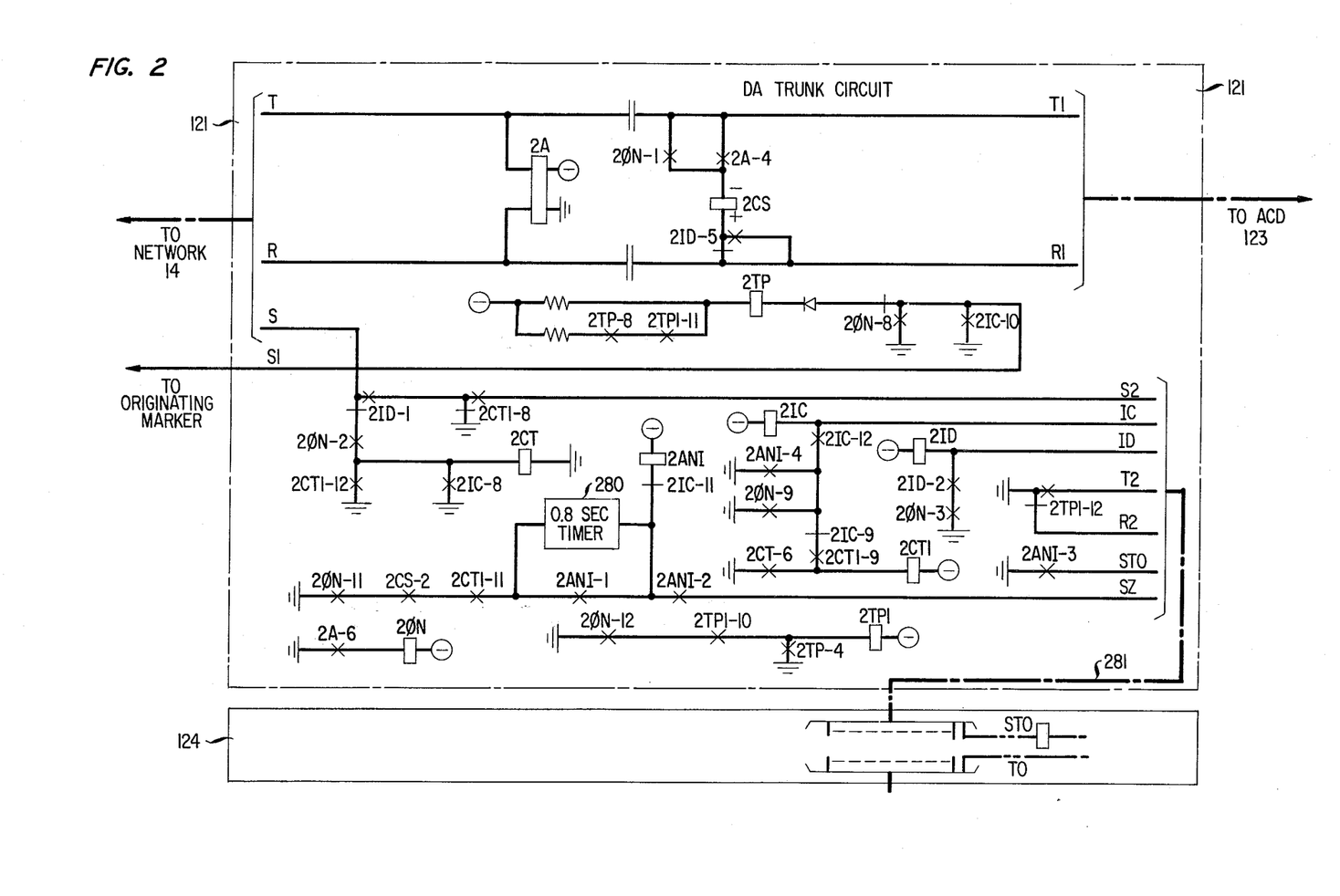

In order to seize DA trunk circuit 121 in response to a directory assistance call, an exchange 10 originating marker (not shown in FIG. 1) applies a resistance ground signal to lead S1 in FIG. 2 to busy-out the trunk circuit and prevent a seizure thereof by another marker. The ground signal is selected by the marker such that sufficient current is drawn to operate relay 2TP in the event the calling station is a tip party of a 2-party line. For single station lines, or if the calling party is a ring party, the current drawn through relay 2TP is insufficient to cause an operation of the relay.

Network 14 of FIG. 1 completes the seizure of trunk circuit 121 by establishing a completed loop between the tip (T) and ring (R) leads of the trunk circuit and an originating sender (not shown). As a result, relay 2A is operated and via its make contact 2A-6 causes the operation of relay 2φN.

Network 14 also applies a voltage potential to the sleeve lead S of DA trunk circuit 121 to cause an operation of cut-through relay 2CT. The resulting operation of make contact 2CT-6 controls the operation of relay 2CT1 which, in turn, applies a ground signal to the S lead toward network 14 by means of its operated make contact 2CT1-12. The ground signal removes operating potential from relay 2CT thereby causing the relay to release.

The operation of relay 2φN completes a loop on the tip and ring leads T1 and R1 to ACD 123 by means of make contact 2φN-1, polar relay 2CS, and break contact 2ID-5 to cause a seizure of the ACD. ACD 123 thereupon connects a directory assistance operator to trunk circuit 121 for serving the call. When an operator is established on the connection, ACD 123 responds with a battery potential reversal on the T1 and R1 leads to trunk circuit 121. Polar relay 2CS operates in response to the reversal and controls the activation of 0.8-second timer 280 via a path extending from the timer and through make contacts 2CT1-11, 2CS-2 and 2φN-11. At the expiration of the 0.8-second timing interval, timer 280 causes the operation of relay 2ANI which, in turn, initiates calling station identification operations for billing the call.

The operation of make contact 2ANI-3 applies a ground signal to lead STO of cable 281 to cause DA link circuit 124 to seize a DANI trunk circuit 125, shown in detail in FIG. 4. Link circuit 124, in response to the signal on lead STO, connects the remaining leads of cable 281 to the selected DANI trunk circuit 125. DANI trunk circuit 125 returns a ground signal on lead ID of cable 281 to DA trunk circuit 121 to acknowledge the seizure. The signal on lead ID results in the operation of relay 2ID in DA trunk circuit 121, which results in the transfer of sleeve lead supervision from trunk circuit 121 to the seized DANI trunk circuit 125. This supervision path extends from the sleeve lead S from network 14, through make contacts 2ID-1 and 2CT1-8 to the sleeve lead S2 of cable 281 and through link circuit 124 to the sleeve lead S2 of DANI trunk circuit 125 in FIG. 4.

The operation of relay 2ANI in DA trunk circuit 121 also applies a ground signal to lead SZ of cable 281 to initiate operation of DANI trunk circuit 125. This signal extends from a ground source, through make contacts 2φN-11, 2CS-2, 2CT1-11, 2ANI-1, and 2ANI-2 to lead SZ. The signal is received on the SZ lead of DANI trunk circuit 125 in FIG. 4 and causes an operation of relay 4φN in that trunk circuit.

The operations of DANI trunk circuit 125 are timed in two stages by timing circuits 495 and 496 which, by way of example, time for respective intervals of 20 and 7 seconds. When trunk circuit 125 is seized, the operation of make contact 4φN-6 enables both of timing circuits 495 and 496. Circuit 495 is initially activated because break contact 4SP-8 is released and allows a potential to reach the timing circuit through relay coil 4Tφ. Circuit 495 times the interval from seizure to a connection of outpulser 385 to DANI trunk circuit 125 as indicated by an operation of relay 4SP. At that time, make contact 4SP-8 operates to activate timing circuit 496 which monitors the remaining interval until completion of all station identification operations. Should either timing circuit expire, thus indicating faulty operation at some point in the system, the activated timing circuit functions to operate time-out relay 4Tφ which, in turn, causes an operation of relay 4AL. Contacts of the relays 4Tφ and 4AL then operate to cause the release of DANI trunk circuit 125.

The operation of contact 4φN-5 as a result of the seizure signal on lead SZ applies a ground signal to lead TO of cable 489 to link circuit 124 to prevent a reseizure of this DANI trunk circuit by the link circuit. Relay 4φN, by means of its contact 4φN-12, applies a signal to lead ST1 of cable 482 to cause outpulser connector 391 in FIG. 3 to cut through the remaining leads of cable 482 to outpulser 385. The operation of make contact 4φN-1 causes the application of a signal to lead DA of cable 482 which is extended through outpulser connector 391 to notify outpulser 385 that the call in question is of a directory assistance class. This signal results in the operation of relay 3DA which, in turn, is held operated by a path consisting of its contact 3DA-2 and outpulser contact 22-φN. As will be described, the operated or nonoperated state of relay 3DA controls the selection of alternate identification codes.

The operation of relay 4φN also causes the seizure of a loop connection to recorder 126 by causing the application of a ground signal to the sleeve lead S3 extending thereto by means of cable 483. This signal is applied through an obvious path extending from the S3 lead, through break contacts 4RL-4, 4T$\phi$-4 and make contact 4$\phi$N-11 to a source of ground. Recorder 126 is arranged to respond to the seizure by entering into its storage a prefix designation identifying the entry as pertaining to a directory assistance call. As will be described, calling station identification information will subsequently be obtained and entered in conjunction with the prefix designation.

As a result of the operation or nonoperation of relay 2TP in DA trunk circuit 121, identifying the calling station as either a tip or ring station, a ground signal is applied to one of respective leads T2 and R2 of cable 281 and extended by means of link circuit 124 to the T2 and R2 leads of DANI trunk circuit 125. In trunk circuit 125, this ground signal is further extended along the T2 or R2 lead on which it is observed, through break contacts 4SP-7 and 4MF-1 of lead T2 or 4SP-10, 4SP1-8, and 4MF-2 of lead R2 to one of respective T3 and R3 leads of cable 482 extending to outpulser 385 in FIG. 3. The signal is used by outpulser 385 for determining which of separate identification fields pertaining to tip and ring 2-party lines is to be scanned by identifier 386 to identify the calling station. The use of separate identification fields for identifying stations on 2-party lines is explained in detail in the Cahill et al U.S. Pat. No. 3,071,650. Since this feature is of no particular relevance to our invention, the reader is referred to the Cahill patent for further details. For this discussion, it is assumed that a calling station is always identified as a ring station.

After a seizure by DANI trunk circuit 125, outpulser 385 controls its internal circuitry, which is symbolically represented by contact 397, to apply a ground signal to lead SP of cable 482 to cause the operation of relay 4SP in DANI trunk circuit 125. The operation of relay 4SP removes information from the DA, ST1, T3 and R3 leads of bus 482 to outpulser 385 by means of respective break contacts 4SP-5, 4SP-3, 4SP-7, and 4SP-10. Outpulser 385 thereupon applies battery potential by means of circuitry symbolically represented by contact 398 to lead SP of cable 482 to DANI trunk circuit 125. The potential is extended through make contact 4SP-2, relay coil 4SP1, and make contact 4$\phi$N-9 to ground to cause the operation of relay 4SP1. The operation of relay 4SP1 completes a loop connection through DANI trunk circuit 125 extending from the T3 lead of cable 482, break contact 4MF-1, make contact 4$\phi$N-7, resistor 484, make contact 4SP1-8 and break contact 4MF-2 to the R3 lead of cable 482. As a result of the loop connection, outpulser 385 seizes identifier 386 and further removes the battery potential on lead SP of cable 482 to DANI trunk circuit 125 to cause the release of relay 4SP1. Outpulser 385 also applies a ground signal to lead R3 of bus 482 requesting that DANI trunk circuit 125 apply a tone signal to the calling subscriber connection to allow identifier 386 to identify the calling station. The ground signal on lead R3 is extended through DANI trunk circuit break contacts 4MF-2, 4SP1-8, and make contact 4SP-10 to cause an operation of relay 4ID. Relay 4ID operates its transfer contacts 4ID-5 to cause a removal of ground from the sleeve lead S2 of cable 489 to DA trunk circuit 121 and to connect a tone supply 487 in place thereof. The tone signal is received on the sleeve lead S2 of DA trunk circuit 121 and is extended to the sleeve lead S to network 14 and therethrough to a termination on DF 140 of switching exchange 10 pertaining to the calling station line. Assuming for purposes of this discussion that the calling station is associated with line 161 of CENTREX 11, the tone signal is received on sleeve lead 150 and extended by means of leads 170 and 171, through cross-connect 160 to number networks 131 and 134 of ANI equipment 18 in FIG. 1. The tone signal is applied through number network 131 to the multiparty bus 129 and through number network 134 to create two alternate identification signals to identifier/outpulser 127, one requesting a seizure of an operator for effecting manual identification and the other associated with the general directory number of CENTREX 11. Identifier 386, in response to the control of outpulser 385, scans the number network appearances from matrix 128 to locate the tone signals.

As explained in Cahill et al., the identification equipment 18 may be associated with a plurality of exchanges other than exchange 10. Identifier 386 therefore initially operates to determine the exchange which is serving the call in question. The exchange identifying information is obtained by tone detector and digit sequencer 388 during the interrogation of thousands digit leads THP9-THP0 and as a function of the particular digit leads on which the thousands digit tone appears. Steering relays (not shown) of identifier 386 operate to cut through the digit leads, beginning with the thousands digit leads THP9-THP0 and progressing sequentially to the unit digit leads UP9-UP0. When leads THP9-THP0 are cut through to sequencer 388, auxiliary cut-through relay contacts 15-TH4 of identifier 386 also are operated to cut through the multiparty bus 129 to multiparty tone detector 1640. For redundancy, the multiparty bus 129 is also cut through to tone detector 1640 by auxiliary contact 15-H4 during the operation of the hundreds digit cut-through relay (not shown) for digit leads HN9-HN0. Since relay 3DA in outpulser 385 is operated as priorly described to define the present call as being for directory assistance, its break contact 3DA-1 interrupts the operate path of multiparty relay 25-PTYA. Assuming, for a moment that the call is not for directory assistance, relay 3DA is nonoperated and the operation of detector 1640, as a result of identifying tone on multiparty bus 129, causes the operation of multiparty relay 25-PTYA to cause the generation of an operator seizure code. Specifically, as described in Cahill et al in detail, the operation of relay 25-PTYA controls the operation of relay 25-PTY which ultimately leads to the operation of relay 23-ID1. As a result, contacts of relay 23-ID1 located within MF signal generator 389 operate to connect the T3 and R3 leads directly to predetermined signal oscillators for generating the operator seizure request identification code. Other relay operations effect the release of identifier 386 and preclude any further action of generator 389 pertaining to the general directory number from digit sequencer 388. The operator seizure request code is outpulsed via outpulser 385 tip and ring leads T3 and R3 to outpulser connector 391 and thence to CAMA exchange 16 in FIG. 1 via CAMA trunk circuit 15. Receipt of the code at exchange 16 results in the seizure of an operator who ascertains from the calling party the desired station billing number.

In the instant example, since the operation of multiparty relay 25-PTYA is inhibited by the operation of break contact 3DA-1, sequencer 388 operates as described in Cahill et al., to receive the tones on digit leads THP9-THP0, HN9-HN0, TP9-TP0 and UP9-UP0 and to convert them to the general directory number of CENTREX 11. As the thousands through the units digits of the directory number are ascertained, they are sequentially transferred to digit register 390 of outpulser 385. The digit register 390, multifrequency signal generator 389, and digit steering circuit 392, cooperate as described in Cahill et al. to outpulse the directory number. In the instant example, the number is outpulsed on T3 and R3 leads of cable 482 to DANI trunk circuit 125 by way of outpulser connector 391 and thence to recorder 126 for storage.

In order to prepare DANI trunk circuit 125 to receive the directory number before it is outpulsed, outpulser 385 removes the ground signal from the R3 lead of cable 482 to release relay 4ID in the trunk circuit. Outpulser 385 then applies a ground signal to lead AB of cable 482 to cause an operation of relay 4MF. The operation of relay 4MF, by means of make contacts 4MF-1 and 4MF-2, connects the T3 and R3 leads of cable 482 to the T4 and R4 leads of cable 483 extending to recorder 126. Outpulser 385 is informed of the completion of this connection by means of battery and ground signals applied through coil 492 to the T3 and R3 leads, respectively, of cable 482. The digits are then sequentially outpulsed by outpulser 385 on the T3 and R3 leads and routed through make contacts 4MF-1 and 4MF-2 to recorder 126 by means of the T4 and R4 leads of cable 83.

The operation of relay 4MF in DANI trunk circuit 125 also results in the operation of relay 4MFA through a path consisting of relay coil 4MFA and make contacts 4MF-5 and 4φN-11 to ground. As a result, relay 4RL is connected by means of make contact 4MFA-10 and other obvious contacts to lead RL of cable 483. When recorder 126 completes the storage operations of the outpulsed directory number, it applies a ground signal to lead RL to operate relay 4RL. The operation of 4RL initiates release operations of DANI trunk circuit 125.

The operation of relay 4MFA further applies a ground signal to lead IC of cable 489 to inform DA trunk circuit 121 of the completion of indentification operations. Trunk circuit 121 responds by disconnecting itself from DA link circuit 124. Specifically, the ground signal is received by DA trunk circuit 121 on its lead IC from cable 281 and results in the operation of relay 2IC. The operation of break contact 2IC-9 interrupts the holding path of relay 2CT1, causing that relay to release. Break contact 2IC-11 also interrupts the holding path of relay 2ANI, which releases and removes signals on leads SZ and STO of cable 281 to cause DA link circuit 124 to release connections to DANI trunk circuit 125. At this point DA trunk circuit 121 is operative only for providing communication between the calling party and an operator at ACD 123.

In DANI trunk circuit 125, the operation of relay 4RL interrupts the S3 lead to recorder 126 by the operation of break contact 4RL-4 to cause the recorder to terminate operations. Relay 4AL is operated by means of an obvious path extending from the relay through make contact 4RL-5 to ground. The operation of break contact 4AL-3 causes relay 4φN to release; the release of make contact 4φN-11 causes the release of relay 4MFA; the release of make contact 4φN-9 causes the release of relay 4SP, which by means of its make contact 4SP-4 interrupts the holding path of and releases relay 4SPA. Timing circuits 495 and 496 are deactivated by the release of make contact 4φN-6. At this time all signals on the leads of cable 482 to outpulser 385 and on cable 483 to recorder 126 are terminated, and DANI trunk circuit 125 is in an idle state awaiting a reseizure by DA link circuit 124.

When the calling party goes on-hook, the subscriber loop connection through network 14 is interrupted, causing relay 2A in DA trunk circuit 121 to release. As a result, the holding paths of relays 2φN, 2ID, and 2IC are interrupted to cause these relays to release and to return DA trunk circuit 121 to an idle state.

It is to be understood that the above-described arrangement is merely illustrative of the application of the principles of the invention, and that other arrangements may be devised by those skilled in the art without departing from the spirit and scope of the invention.

What is claimed is:

1. In a communication system including a plurality of stations, a switching exchange having means for distinguishing between different classes of toll calls from the stations, automatic billing facilities, means for identifying a calling one of the stations and means for communicating calling station identification information to the billing facilities, the improvement comprising,
   means for generating a plurality of station identification codes in response to a call from a selected one of the stations, and
   means operated by the distinguishing means for controlling the generating means to select one of the codes for communication to the billing facilities in accordance with the class of call in progress.

2. The invention of claim 1 wherein
   said billing facilities comprises a plurality of means each for storing billing information pertaining to calls of a different class,
   said communicating means comprises a plurality of trunk means each for coupling the identifying means to a different one of the storing means determined by the class of the call, and
   said controlling means includes means operated by said trunk means for outpulsing the selected identification code to a coupled one of the storing means.

3. The invention of claim 1 wherein said generating means comprises
   means responsive to a call from the selected station for producing plural identification signals each associated with a different identification code, and
   means operated by said distinguishing means for selecting one of the signals in accordance with the class of call, and said controlling means comprises means for tranforming the selected signal into the corresponding identification code.

4. The invention of claim 1 wherein said identifying means comprises
   means for applying a prescribed signal to an exchange appearance associated with the selected station, and said generating means comprises
   matrix means having a plurality of isolation networks divided into groups with each group having an output associated with a different station identification code,
   means for connecting said exchange appearance to one of the networks in at least two different groups so that the prescribed signal is applied to each of the outputs of the associated groups, and
   means operated by said controlling means for operating said generating means to respond to the signal from only one of said outputs.

5. A communication system including a plurality of stations, a switching exchange having means for distinguishing between different classes of toll calls from the stations, a plurality of storage means for receiving billing information pertaining to the calls, and calling station identification means, wherein said calling station identification means comprises     means for generating plural station identification signals each associated with a different station identification code in response to a call from a predetermined one of the stations, and     means having a plurality of ports equal to at least the number of plural identification signals and operated upon seizure by said distinguishing means of a prescribed port defined by the class of call in progress for scanning the generating means, said scanning means comprising     means operated in accordance with the seized port for selecting a prescribed one of the identification signals,     means for transforming the selected signal into its associated identification code, and     means for outpulsing the code to a prescribed one of the storage means associated with the seized port.

6. The invention of claim 5 wherein said generating means comprises matrix means having a plurality of input terminations each associated with a different prescribed station identification code, and     means for connecting an exchange appearance of said predetermined station to at least two prescribed ones of said terminations, and said exchange comprises     means controlled by said scanning means for applying a signal to said exchange appearance in response to a call from said predetermined station to generate said plural identification signals.

7. The invention of claim 5 wherein said system further comprises first means activated by said distinguishing means for coupling the exchange to one of the storage means and to one of said ports associated with the coupled storage means,     second means activated by said distinguishing means for coupling the exchange with another of the storage means and another one of said ports and wherein said selecting means includes means operated by said second coupling means for controlling the selection of a prescribed one of said identification signals.

8. In combination, a first telephone switching exchange, a second private telephone exchange connected to the first exchange and having a plurality of stations and station lines, calling station identification means, first storing means for storing station billing information, first coupling means for coupling the first exchange to the first storing means and to the identification means for a first class of call from one of the stations, second storing means for storing station billing information, second coupling means for coupling the first exchange to the second storing means and to the identification means for a second class of call from one of the stations, a plurality of means in said identification means each responsive to a first signal from the exchange for generating a second signal associated with a calling station identification code, means for associating at least two of said generating means with each of the station lines, means for activating said first signal in response to a call from one of the stations, whereby the generating means operate to generate at least two different station identification signals, means in said identification means controlled by said first and second coupling means for selecting one of said different identification signals in accordance with the class of call in progress, and means for outpulsing a code associated with the selected identification signal to the coupled one of said first and second storing means.

9. A calling station identifier for use in a telephone exchange serving a plurality of stations in compiling billing information pertaining to toll calls originated from the stations, comprising     means for generating alternate station identification codes in response to a toll call from a prescribed one of the stations, and     means operated by the exchange in accordance with the class of the toll call for controlling the generating means to select a desired one of the alternate codes to which billing for the call is to be directed.

10. The invention of claim 9 wherein said generating means comprises means having a plurality of outputs and being activatable by a first signal from the exchange in response to said call for producing a second signal on at least two of the outputs each associated with a different one of said identification codes,     means for scanning the outputs to locate the second signals,     means operated by said controlling means for selecting one of the second signals according to the toll class of said call, and     means for transforming said selected signal into its associated identification code.

11. A calling station identification arrangement for use in a telephone exchange having a switching network and a plurality of stations connected to the network, comprising     first and second trunk means connectable to the network for extending first and second classes of calls, respectively, originating from the stations,     means responsive to the initiation of a call of either of said first and second classes from a prescribed one of the stations for generating at least two station identification numbers, and     means actuatable by said first and second trunk means for selecting one of said identification numbers in accordance with the class of call initiated by said prescribed station.

12. The invention of claim 11 wherein said prescribed station has a sleeve appearance at the exchange connected to said network and said generating means comprises     an identification matrix including a plurality of number networks each associated with a different station identification number,     means for connecting at least two predetermined ones of the number networks to said sleeve appearance, means for controlling one of said first and second trunk means to apply a first signal through said network to said sleeve appearance in response to said call, thereby causing the generation of a second signal from each of said predetermined number networks, said selecting means being operative to select one of the second signals in accordance with the class of said call, and means for transforming said selected second signal into its associated identification number.

13. The invention of claim 12 wherein said generating means further comprises a first port seizable by said first trunk means for a first class of call, a second port seizable by said second trunk means for a second class of call, and said selecting means comprises a multistate device operated to different ones of its states in accordance with seizures of respective said first and second ports and means operated according to the state of said device for effecting the selection of said second signals.

* * * * *

UNITED STATES PATENT AND TRADEMARK OFFICE
CERTIFICATE OF CORRECTION

PATENT NO. : 4,027,104

DATED : May 31, 1977

INVENTOR(S) : Arthur P. Levitt, Robert V. Oakley, and Roy E. Paterson

It is certified that error appears in the above-identified patent and that said Letters Patent are hereby corrected as shown below:

In column 4, line 48, "CENTREX 1" should read --CENTREX 11--. Column 7, line 18, "observed" should read --received--. Column 9, line 28, "cable 83" should read --cable 483--.

Signed and Sealed this

Twenty-first Day of February 1978

[SEAL]

Attest:

RUTH C. MASON
Attesting Officer

LUTRELLE F. PARKER
Acting Commissioner of Patents and Trademarks